United States Patent
Moran et al.

(10) Patent No.: US 10,240,989 B2
(45) Date of Patent: Mar. 26, 2019

(54) MAGNETOELASTIC SENSOR USING STRAIN-INDUCED MAGNETIC ANISOTROPY TO MEASURE THE TENSION OR COMPRESSION PRESENT IN A PLATE

(71) Applicant: Methode Electronics, Inc., Carthage, IL (US)

(72) Inventors: Timothy J. Moran, Chicago, IL (US); Frank Ursetta, Chicago, IL (US)

(73) Assignee: METHOD ELECTRONIC, INC., Chicago, IL (US)

( * ) Notice: Subject to any disclaimer, the term of this patent is extended or adjusted under 35 U.S.C. 154(b) by 361 days.

(21) Appl. No.: 14/586,017

(22) Filed: Dec. 30, 2014

(65) Prior Publication Data

US 2015/0204737 A1  Jul. 23, 2015

Related U.S. Application Data

(60) Provisional application No. 61/925,509, filed on Jan. 9, 2014, provisional application No. 61/921,757, filed on Dec. 30, 2013.

(51) Int. Cl.
*G01L 1/12* (2006.01)

(52) U.S. Cl.
CPC ......... *G01L 1/122* (2013.01); *Y10T 29/49826* (2015.01)

(58) Field of Classification Search
CPC ....... G01L 3/1435; G01L 3/102; G01L 3/103; G01L 9/0001; G01R 31/3606;
(Continued)

(56) References Cited

U.S. PATENT DOCUMENTS 5,142,225 A   8/1992 Gerlach et al.
5,198,763 A   3/1993 Konishi
(Continued)

FOREIGN PATENT DOCUMENTS

DE   102008032329 A1   1/2010
EP      2128581 A1   12/2009
(Continued)

OTHER PUBLICATIONS

International Search Report dated Apr. 17, 2015; International Application No. PCT/US2014/072756; International Filing Date: Dec. 30, 2014; 3 pages.
(Continued)

*Primary Examiner* — Harshad R Patel
*Assistant Examiner* — Brandi N Hopkins
(74) *Attorney, Agent, or Firm* — Blank Rome LLP

(57) ABSTRACT

A magnetoelastic sensor. The magnetoelastic sensor uses strain-induced magnetic anisotropy to measure the tension or compression present in a plate. During construction, an annular region of the plate is magnetized with a circumferential magnetization. Magnetic field sensors are placed near this magnetized band at locations where the magnetization direction is non-parallel and non-perpendicular to the axis of tension. The strain-induced magnetic anisotropy caused by tension or compression then produces a shift in the magnetization direction in the plate regions near the field sensors, thereby causing magnetic field changes which are detected by the magnetic field sensors. The magnetic field sensors are connected to an electronic circuit which outputs a voltage signal which indicates the tension or compression in the plate.

18 Claims, 17 Drawing Sheets

(58) Field of Classification Search
CPC ....... G01R 33/16; G01R 33/07; H01M 10/48; Y10T 29/53196; G01D 5/145; G01D 5/2448; G01P 13/02; G01N 27/72; G01N 11/16; G01N 29/2412; G01N 2291/02881; G01N 2291/015; G01N 2291/02818; G01N 9/002; G01N 29/0609; G01N 29/341; G01N 2291/014; G01N 2291/0222; G01N 2291/02827; F16C 11/06; G01K 7/38; B60D 1/248
USPC ......... 73/862.69, 779, 862.331–334, 862.08, 73/862.193, 862.321; 324/242, 235; 177/144; 29/428
See application file for complete search history.

(56) References Cited

U.S. PATENT DOCUMENTS

| | | | |
|---|---|---|---|
| 5,351,555 | A | 10/1994 | Garshelis |
| 5,365,791 | A | 11/1994 | Padula et al. |
| 5,465,627 | A | 11/1995 | Garshelis |
| 5,520,059 | A | 5/1996 | Garshelis |
| 5,591,925 | A | 1/1997 | Garshelis |
| 5,706,572 | A | 1/1998 | Garshelis |
| 5,708,216 | A | 1/1998 | Garshelis |
| 5,763,793 | A | 6/1998 | Ng et al. |
| 5,789,915 | A | 8/1998 | Ingraham |
| 5,802,479 | A | 9/1998 | Kithil et al. |
| 5,817,952 | A | 10/1998 | Swisher et al. |
| 5,837,908 | A | 11/1998 | Ng et al. |
| 5,887,335 | A | 3/1999 | Garshells |
| D409,935 | S | 5/1999 | Speckhart |
| 5,955,881 | A | 9/1999 | White et al. |
| 5,975,568 | A | 11/1999 | Speckhart et al. |
| 6,014,025 | A | 1/2000 | Cripe |
| 6,014,602 | A | 1/2000 | Kithil et al. |
| 6,047,605 | A | 4/2000 | Garshelis |
| 6,057,682 | A | 5/2000 | McCurley et al. |
| 6,145,387 | A | 11/2000 | Garshelis |
| 6,220,105 | B1* | 4/2001 | Cripe ............. G01L 1/125 73/862.333 |
| 6,222,363 | B1 | 4/2001 | Cripe |
| 6,260,423 | B1 | 7/2001 | Garshelis |
| 6,275,146 | B1 | 8/2001 | Kithil et al. |
| 6,346,812 | B1 | 2/2002 | May et al. |
| 6,360,841 | B1 | 3/2002 | Blandino et al. |
| 6,490,934 | B2 | 12/2002 | Garshelis |
| 6,513,395 | B1 | 2/2003 | Jones |
| 6,553,847 | B2 | 4/2003 | Garshelis |
| 6,581,480 | B1 | 6/2003 | May et al. |
| 6,655,471 | B2 | 12/2003 | Cripe et al. |
| 6,698,299 | B2 | 3/2004 | Cripe |
| 6,761,229 | B2 | 7/2004 | Cripe et al. |
| 6,765,357 | B2 | 7/2004 | Cripe et al. |
| 6,776,057 | B1 | 8/2004 | May |
| 6,810,754 | B2 | 11/2004 | May |
| 6,826,969 | B1 | 12/2004 | May |
| 6,844,541 | B2 | 1/2005 | Alsobrooks et al. |
| 6,871,555 | B2 | 3/2005 | May |
| 6,904,814 | B2 | 6/2005 | May |
| 6,910,391 | B1 | 6/2005 | May |
| 6,956,198 | B2 | 10/2005 | Alsobrooks et al. |
| 6,959,612 | B2 | 11/2005 | May |
| 6,997,065 | B2 | 2/2006 | May |
| 7,062,981 | B1 | 6/2006 | Spohr |
| 7,117,752 | B2 | 10/2006 | May |
| 7,124,649 | B2 | 10/2006 | May |
| 7,140,258 | B2 | 11/2006 | May |
| 7,219,564 | B1 | 5/2007 | May |
| 7,237,443 | B2 | 7/2007 | Speckhart et al. |
| 7,302,867 | B2 | 12/2007 | May |
| 7,305,882 | B1 | 12/2007 | May |
| 7,317,392 | B2 | 1/2008 | DuRocher |
| 7,521,923 | B2 | 4/2009 | May et al. |
| 7,569,952 | B1 | 8/2009 | Bono et al. |
| 7,699,118 | B2 | 4/2010 | Setter et al. |
| 8,087,304 | B2 | 1/2012 | Lee |
| 8,151,654 | B2 | 4/2012 | Speckhart et al. |
| 8,424,393 | B1 | 4/2013 | Lee |
| 8,578,794 | B2 | 11/2013 | Lee |
| 8,635,917 | B2 | 1/2014 | Lee |
| 8,779,306 | B2 | 7/2014 | Gauthier et al. |
| 8,836,458 | B2 | 9/2014 | Lee |
| 8,893,562 | B2 | 11/2014 | Barraco et al. |
| 9,046,430 | B2 | 6/2015 | Moran et al. |
| 9,086,460 | B2 | 7/2015 | Rice et al. |
| 2001/0029792 | A1 | 10/2001 | Garshelis |
| 2002/0027348 | A1 | 3/2002 | Speckhart et al. |
| 2004/0031332 | A1 | 2/2004 | May |
| 2004/0069071 | A1 | 4/2004 | Speckhart et al. |
| 2005/0184496 | A1 | 8/2005 | Speckhart et al. |
| 2006/0150388 | A1* | 7/2006 | Inada ............. B21C 37/0815 29/516 |
| 2006/0250029 | A1 | 11/2006 | Kelly et al. |
| 2007/0103104 | A1 | 5/2007 | May |
| 2009/0107257 | A1 | 4/2009 | May |
| 2010/0018328 | A1 | 1/2010 | May |
| 2010/0127698 | A1* | 5/2010 | Shimada ............. G01L 1/125 324/209 |
| 2010/0242626 | A1* | 9/2010 | Weng ............. G01L 3/102 73/862.333 |
| 2010/0301846 | A1 | 12/2010 | Lee |
| 2012/0166046 | A1 | 6/2012 | Speckhart et al. |
| 2012/0194198 | A1 | 8/2012 | Moran |
| 2012/0316814 | A1 | 12/2012 | Rahaman et al. |
| 2013/0088218 | A1 | 4/2013 | Rahaman et al. |
| 2013/0091960 | A1* | 4/2013 | Lee ............. G01L 3/1435 73/862.335 |
| 2015/0204737 | A1 | 7/2015 | Moran et al. |
| 2015/0276520 | A1 | 10/2015 | Ursetta et al. |

FOREIGN PATENT DOCUMENTS

| | | |
|---|---|---|
| WO | 2000058704 | 10/2000 |
| WO | 2003014757 | 2/2003 |
| WO | 2004029569 | 4/2004 |
| WO | 2004074787 | 9/2004 |

OTHER PUBLICATIONS

Written Opinion dated Apr. 17, 2015; International Application No. PCT/US2014/072756; International Filing Date: Dec. 30, 2014; 10 pages.

International Preliminary Report on Patentability dated Jul. 5, 2015; International Application No. PCT/US2014/072756; International Filing Date Dec. 30, 2014; 11 pages.

* cited by examiner

MAGNETOELASTIC SENSOR USING STRAIN-INDUCED MAGNETIC ANISOTROPY TO MEASURE THE TENSION OR COMPRESSION PRESENT IN A PLATE

CROSS REFERENCE TO RELATED APPLICATIONS

This application claims the benefit of U.S. Provisional Application No. 61/921,757, entitled "Magnetoelastic Tension Sensor," filed Dec. 30, 2013, and U.S. Provisional Application No. 61/925,509 entitled "Magnetoelastic Tension Sensor," filed Jan. 9, 2014, the contents of which applications are incorporated herein by reference.

BACKGROUND OF THE INVENTION

Field of the Invention

The present invention relates to a magnetoelastic sensor and, more specifically, to a magnetoelastic sensor for sensing tension or compression.

Description of Related Art

Conventional tension and compression sensors use strain gauges to produce electrical signals which indicate the tension or compression present. Illustrated in FIG. 13 is a conventional strain gauge, generally designated as 1300. The strain gauge 1300 comprises an input 1310 and an output 1320 connected by a plurality of windings 1330. The input 1310, output 1320, and plurality of windings 1330 are formed from a thin-film conductor 1340, such as a metal foil. The input 1310, output 1320, and plurality of windings 1330 are disposed on an insulative substrate 1350.

The insulative substrate 1350 is adhered to a surface for which strain is desired to be measured. Strain is measured by sensing a resistance of the thin-film conductor 1340 as the strain gauge 1300 is deformed when under tension or compression. When stretched in a direction indicated by A or B in FIG. 13, the resistance of the thin-film conductor 1340 increases. Thus, by measuring the increase in resistance, the tension of the surface to which the strain gauge 1300 is attached may be inferred. When compressed in a direction opposite to that indicated by A or B in FIG. 13, the resistance of the thin-film conductor 1340 decreases. Thus, by measuring the decrease in resistance, the compression of the surface to which the strain gauge 1300 is attached may be inferred.

S-shaped tension or compression sensors, also known as load cells, typically incorporate one or more conventional strain gauges 1300 to sense tension or compression. Illustrated in FIG. 14 is a conventional S-shaped load cell, generally designated as 1400. The load cell 1400 comprises a first arm 1410, a second arm 1420, and a body 1430. Disposed on the body is a plurality of strain gauges 1440A through 1440D. Each strain gauge 1440 may be a strain gauge 1300.

The load cell 1400 detects an amount of force applied in directions generally designed as C in FIG. 14. When the force is applied in the directions C, the strain gauges 1440A and 1440D undergo compression, and the strain gauges 1440B and 1440D undergo tension. By measuring the tension and compression, the size of the force can be calculated.

Conventional tension sensors using magnetoelastic effects are described in U.S. Pat. Nos. 5,195,377 to Garshelis, and U.S. Pat. No. 6,220,105 to Cripe. A conventional Villari effect tension sensor is described in U.S. Pat. No. 5,905,210 to O'Boyle et al.

BRIEF SUMMARY OF THE INVENTION

In accordance with an aspect of the present invention, there is provided a tension sensor comprising a plate comprising a magnetoelastic region. The tension sensor further comprises at least one pair of sensors disposed above the magnetoelastic region. The at least one pair of sensors are configured to sense a change in a magnetic field produced by the magnetoelastic region in response to a strain in the plate imposed by a tension on the plate.

In accordance with another aspect of the present invention, there is provided a compression sensor comprising a plate comprising a magnetoelastic region. The compression sensor further comprises at least one pair of sensors disposed above the magnetoelastic region. The at least one pair of sensors are configured to sense a change in a magnetic field produced by the magnetoelastic region in response to a strain in the plate imposed by a compression on the plate.

In accordance with yet another aspect of the present invention, there is provided method of manufacturing a magnetoelastic sensor. The method comprises steps of forming a plate from an austenitic non-magnetic stainless steel alloy, cold-working an area of the plate to convert the austenitic non-magnetic stainless steel alloy in the area of the plate to martensite, rotating the plate, bringing a magnet near a surface of the plate and near the area of the plate converted to martensite to magnetize the area, and mounting at least one pair of magnetic field sensor assemblies above the surface of the plate near the magnetized area.

BRIEF DESCRIPTION OF THE DRAWINGS

For the purpose of illustration, there are shown in the drawings certain embodiments of the present invention. In the drawings, like numerals indicate like elements throughout. It should be understood that the invention is not limited to the precise arrangements, dimensions, and instruments shown. In the drawings:

FIG. 8 illustrate an exemplary alternative embodiment of the magnetoelastic tension sensor of FIG. 1, in accordance with an exemplary embodiment of the present invention;

DETAILED DESCRIPTION OF THE INVENTION

Figure 1:
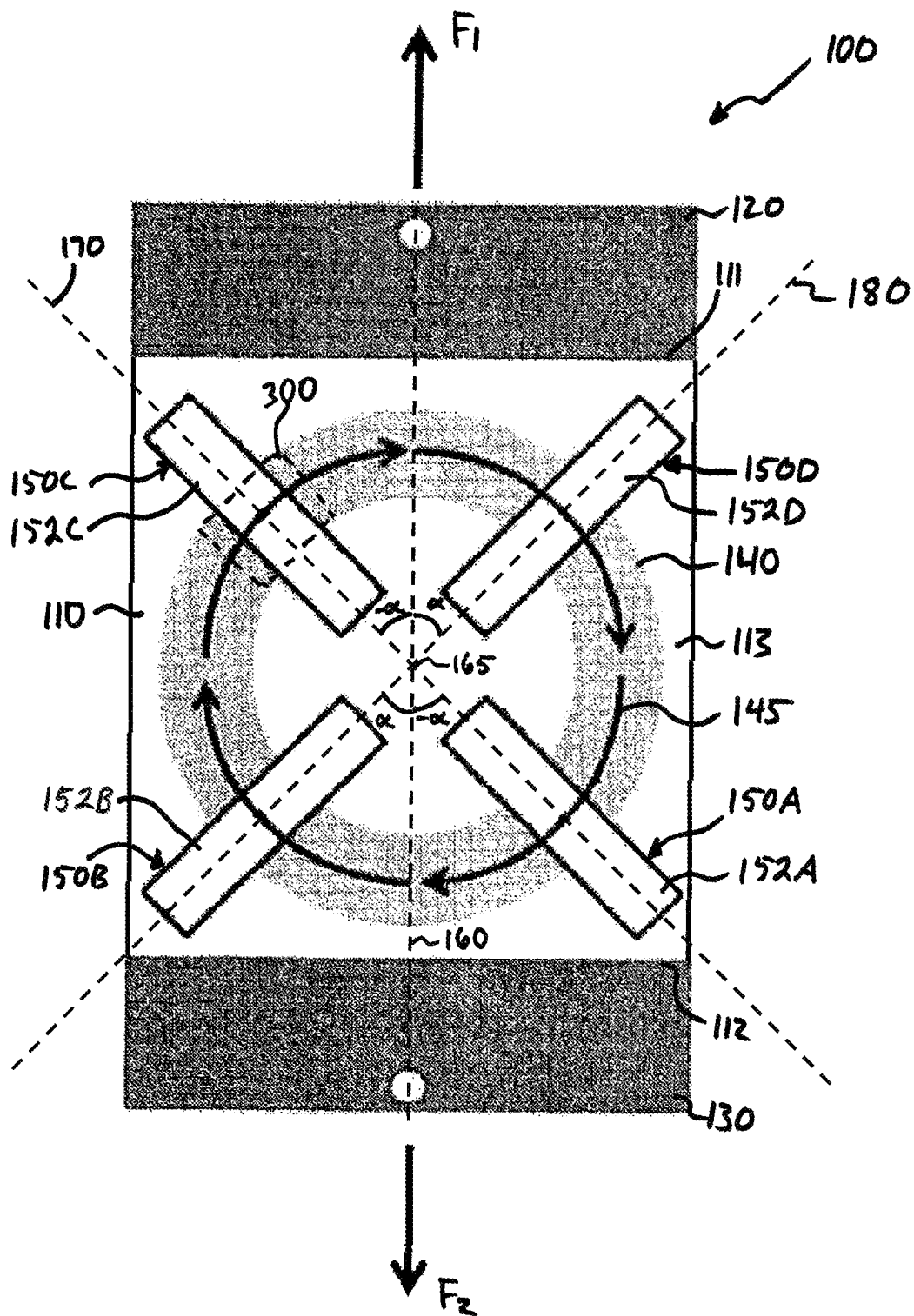
FIG. 1 is top view of a magnetoelastic tension sensor comprising a plate and a plurality of sensor assemblies, in accordance with an exemplary embodiment of the present invention.

Reference to the drawings illustrating various views of exemplary embodiments of the present invention is now made. In the drawings and the description of the drawings herein, certain terminology is used for convenience only and is not to be taken as limiting the embodiments of the present invention. Furthermore, in the drawings and the description below, like numerals indicate like elements throughout.

Figure 2A:
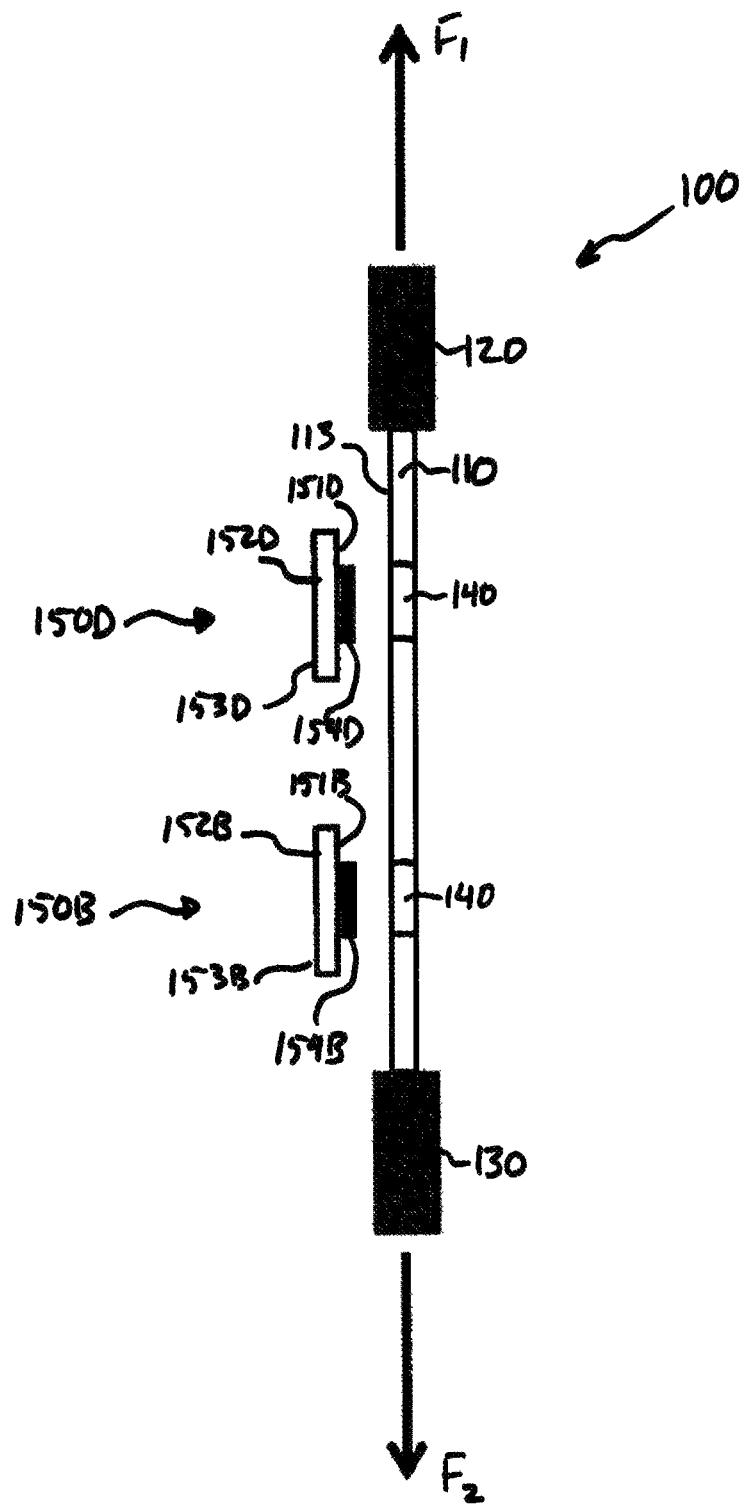
FIG. 2A is a first cross-sectional view of the magnetoelastic tension sensor of FIG. 1, in accordance with an exemplary embodiment of the present invention.

Illustrated in FIG. 1 is a top view of an exemplary embodiment of a magnetoelastic sensor, generally designated as 100, in accordance with an exemplary embodiment of the present invention. FIG. 2A illustrates a right-side view along a cross-section of the magnetoelastic sensor 100 at a section line 180, and FIG. 2B illustrates a left-side view along a cross-section of the magnetoelastic sensor 100 taken at a section line 170.

Figure 2B:
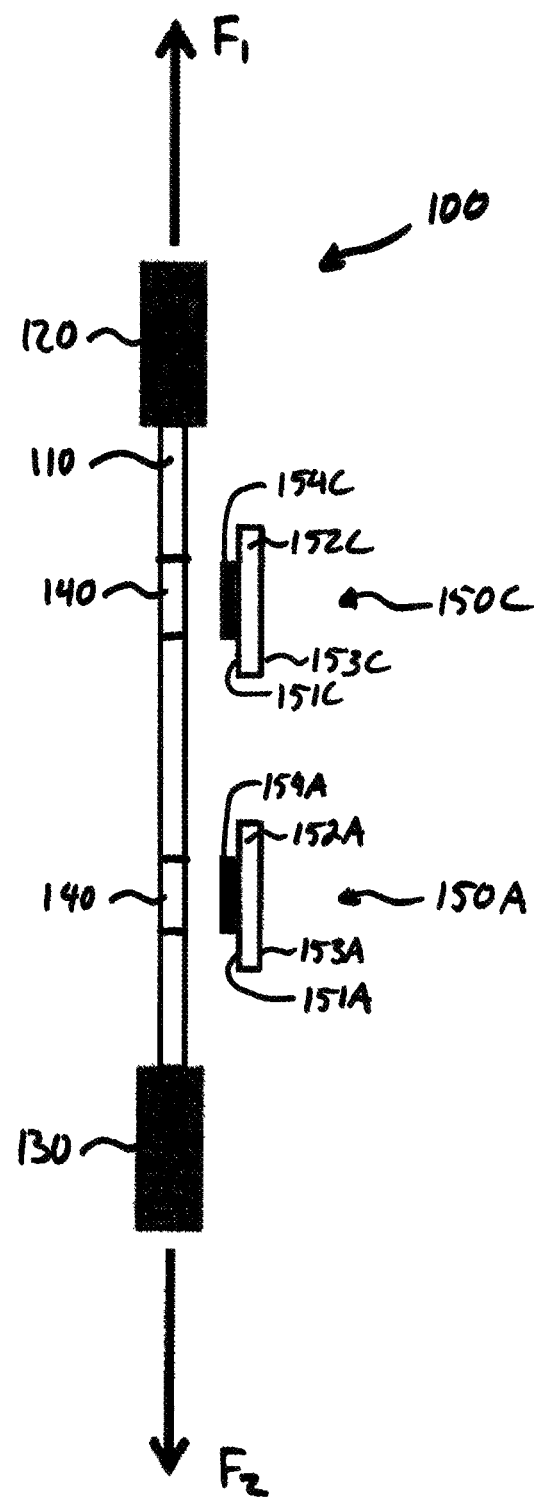
FIG. 2B is a second cross-sectional view of the magnetoelastic tension sensor of FIG. 1, in accordance with an exemplary embodiment of the present invention.

Referring to FIGS. 1, 2A, and 2B, the magnetoelastic sensor 100 comprises a plate 110, a first distribution bar 120 connected to the plate 110 at a first end 111 of the plate 110, and a second distribution bar 130 connected to the plate 110 at a second end 112 of the plate 110. Disposed in the plate 110 is a magnetic band 140. In the exemplary embodiment of the magnetic band 140 illustrated in FIG. 1, the magnetic band 140 is an annulus. In other exemplary embodiments of the magnetic band 140, different shapes of the magnetic band 140 are contemplated. For example, the magnetic band 140 may be diamond shaped. It is to be understood that the plate 110 may have various dimensions, may not be perfectly planar on either surface, and may not have a perfectly uniform thickness across its entire length.

Disposed above the magnetic band 140 are a plurality of sensor assemblies 150A, 150B, 150C, and 150D. Each of the sensor assemblies 150A, 150B, 150C, and 150D comprises, respectively, a sensor platform 152A, 152B, 152C, and 152D on which a respective sensor 154A, 154B, 154C, and 154D is disposed. The sensors 154A and 154C are disposed along the section line 170 (also referred to herein as "centerline 170"). The sensors 154B and 154D are disposed along the section line 180 (also referred to herein as "centerline 180"). The centerline 170 longitudinally bisects the sensor assemblies 150A and 150C and their respective sensors 154A and 154C. The center line 170 longitudinally bisects the sensor assemblies 150B and 150D and their respective sensors 154B and 154D. The sensors 154A, 154B, 154C, and 154D are disposed symmetrically about a center point 165 of the plate 110, which center point 165 is also the center point of the magnetic band 140. The sensors 154A, 154B, 154C, and 154D are disposed over the magnetic band 140 such that a centerline 145 of the magnetic band 140 laterally bisects the sensors 154A, 154B, 154C, and 154D.

The sensor assemblies 150A, 150B, 150C, and 150D are disposed on the magnetic band 140 each at a respective angle, $-\alpha$, $\alpha$, $-\alpha$, and $\alpha$, relative to a longitudinal axis 160 of the plate 110. The angles, $\alpha$ and $-\alpha$, are chosen so that the centerlines 170 and 180 are neither parallel to the longitudinal axis 160 nor perpendicular thereto.

In an exemplary embodiment, the angles, $\alpha$ and $-\alpha$, are chosen so that the centerlines 170 and 180 intersect the magnetized band 140 perpendicularly to a tangent of the centerline 145 of the magnetic band 140, and where the magnetic field produced by the magnetic band 140 at the points of intersection is neither parallel nor perpendicular to the centerline 160 of the plate 110.

In another exemplary embodiment, the magnitude of angle, $\alpha$, $-\alpha$, is chosen to be greater than or equal to 30° and less than or equal to 60°.

In yet another exemplary embodiment, the magnitude of angle, $\alpha$, $-\alpha$, is chosen to be greater than or equal to 40° and less than or equal to 50°.

In still another exemplary embodiment, the magnitude of angle, $\alpha$, $-\alpha$, is 45°.

The magnetic field sensors 154A, 154B, 154C, and 154D each produce an output signal that changes when a magnetic field produced by the magnetized band 140 in a direction parallel to the centerlines 170 and 180 changes. The magnetic field sensors 154A and 154C have high sensitivity to magnetic fields parallel to the centerline 170, and the magnetic field sensors 154B and 154D have high sensitivity to magnetic fields parallel to the centerline 180.

The first and second distribution bars 120, 130 at the top 111 and the bottom 112 of the plate 110 are thicker than the plate 110. Thus, as forces, $F_1$ and $F_2$, are applied to the distribution bars 120, 130, respectively, an even amount of strain or compression is produced in the plate 110, rather than a large amount of strain or compression along the center line 160 of the plate 110 and less elsewhere.

In an alternative exemplary embodiment of the magnetoelastic sensor 100, the first and second distribution bars 120, 130 are formed integrally with the plate 110 and are areas of the plate that are thicker than the portion of the plate 110 in which the magnetized band 140 is disposed. In such embodiment, as forces, $F_1$ and $F_2$, are applied to the distribution bars 120, 130, respectively, an even amount of strain or compression is produced in the plate 110, rather than a large amount of strain along the center line 160 of the plate 110 and less elsewhere.

In the exemplary embodiment of the magnetoelastic sensor 100 described above, the magnetic band 140 is formed within the plate 110. In such embodiment, the magnetic band 140 may be formed from a magnetized band that is molded within a nonmagnetized or nonmagnetizable, e.g., non-ferromagnetic, plate 110.

In another exemplary embodiment of the magnetoelastic sensor 100, the magnetic band 140 may be a magnetized region of the plate 110, in which case the plate 110 is formed entirely from a ferromagnetic material. It is to be understood that other exemplary embodiments of the magnetoelastic sensor 100 in which the magnetic band 140 is disposed above or on a top surface 113 of the plate 110 are contemplated. In such other embodiments, the plate 110 is not magnetized and may be formed from a material that is not capable of being magnetized.

In yet another exemplary embodiment of the magnetoelastic sensor 100, the plate 110 is made from a non-magnetic material where the region 140 can be subjected to a process to change its metallurgical phase. A type of austenitic non-magnetic stainless steel alloy is selected to form the plate 110. The area corresponding to the region 140 is cold-worked to convert it to martensite, which is ferromagnetic. The plate 110 is rotated around an axis perpendicular to the center point 165 of the plate 110, and then while it is rotating, a permanent magnet is brought close to the surface 113 of the plate 110 near the area of the plate 110 corresponding to the region 140 for a large number of revolutions. The permanent magnet is removed after a magnetization direction has been imparted in the region 140. This approach is beneficial because forming the plate 110 from a homogeneously ferromagnetic material could lead to problems, and molding or attaching the region 140 could be problematic because of the extremely high interface shear stresses in the plate 110 in certain applications. Sensor assemblies in accordance with the exemplary embodiments described herein are then mounted above the surface 113 of the plate 110.

In an exemplary embodiment in which the plate 110 is formed from a ferromagnetic material, the magnetized band 140 having a circumferential magnetization direction indicated by the arrowed centerline 145 in FIG. 1 is produced by rotating the plate 110 around an axis perpendicular to the center point 165 of the plate 110, and then while it is rotating, bringing a permanent magnet close to the surface 113 of the plate 110 for a large number of revolutions. The permanent magnet is removed after a magnetization direction has been imparted in the magnetic band 140, which is a magnetized region of the plate 110. In this exemplary embodiment, the plate 110 is formed from a ferromagnetic material. It is to be understood that reference number 145 also refers to the magnetic field produced by the magnetic band 140. Sensor assemblies in accordance with the exemplary embodiments described herein are then mounted above the surface 113 of the plate 110.

Although FIG. 1 illustrates a single magnetic band 140, it is to be understood that other exemplary embodiments in which a plurality of permanent magnets placed at various azimuthal locations in the plate 110 can also be used. In other exemplary embodiments, more than one magnetic band may be formed in or on the plate 110, in which case the magnetoelastic sensor comprises four sensor assemblies for each ring. In still other exemplary embodiments, instead of a permanent magnet forming the magnetic band 140, an electromagnet is used to produce the magnetized band 140.

FIG. 2A illustrates the relative positions of the sensor assemblies 150B and 150D and the plate 110. FIG. 2B illustrates the relative positions of the sensor assemblies 150A and 150C and the plate 110.

As illustrated in FIGS. 2A and 2B, the sensor platforms 152A, 152B, 152C, and 152D comprise, respectively, inside surfaces 151A, 151B, 151C, and 151D on which the sensors 154A, 154B, 154C, and 154D are respectively disposed. The sensor platforms 152A, 152B, 152C, and 152D further comprise, respectively, outside surfaces 153A, 153B, 153C, and 153D. The inside surfaces 151A, 151B, 151C, and 151D face the magnetic band 140 such that the sensors 154A, 154B, 154C, and 154D, as disposed on the respective inside surfaces 151A, 151B, 151C, and 151D, are between the magnetic band 140 and the respective sensor platforms 152A, 152B, 152C, and 152D.

Figure 3:
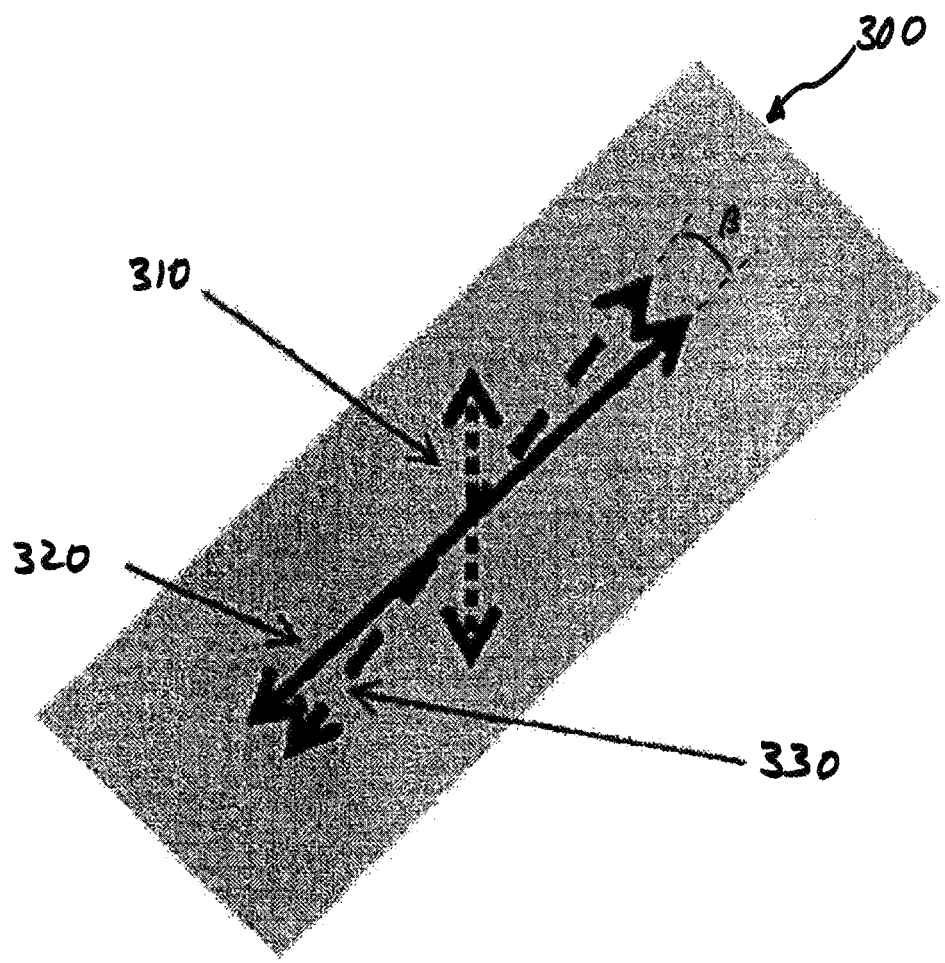
FIG. 3 illustrates a detailed view of a region of the plate of the magnetoelastic tension sensor of FIG. 1, in accordance with an exemplary embodiment of the present invention.

FIG. 3 illustrates a detailed view of a region 300 of the plate 110 under the sensor assembly 150C and specifically a region 300 of the magnetic band 140 under the sensor assembly 150C, in accordance with an exemplary embodiment of the present invention. Inside this region 300, there are illustrated a tension axis (also referred to as a "magnetoelastic anisotropy axis") 310, a first effective anisotropy axis 320, and a second effective anisotropy axis 330.

The first effective anisotropy axis 320 is the direction of the magnetic field 145 produced by the magnetic band 140 when the forces, $F_1$ and $F_2$, are not present. The second effective anisotropy axis 330 is the direction of the magnetic field 145 produced by the magnetic band 140 when the forces, $F_1$ and $F_2$, are present. The second effective anisotropy axis 330 is a result of the combination of the tension axis 310 and the first effective anisotropy axis 320 and is proportional to the strength of the forces, $F_1$ and $F_2$. The first effective anisotropy axis 320 is offset from the second effective anisotropy axis 330 by an angle $\beta$, which changes as the magnitude of the forces, $F_1$ and $F_2$, change. The angle, $\beta$, increases as the magnitude of the forces, $F_1$ and $F_2$, increase and decreases at the magnitude of the forces, $F_1$ and $F_2$, decrease.

Figure 4:
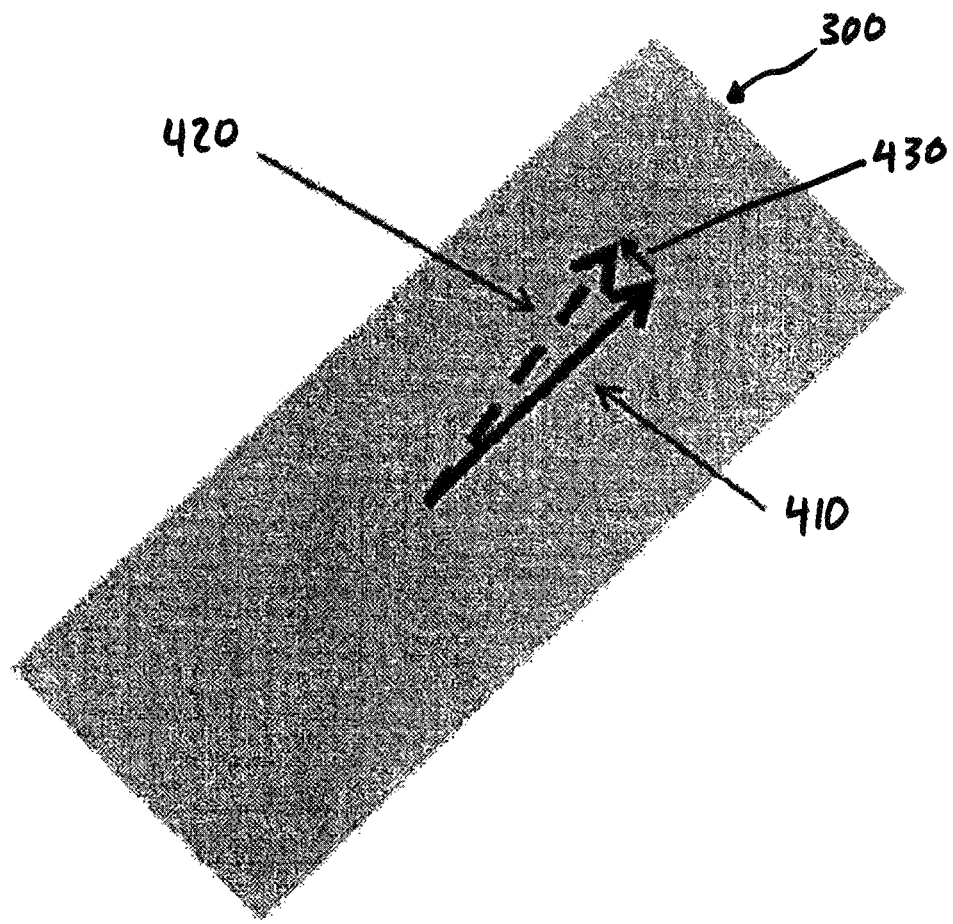
FIG. 4 illustrates another detailed view of a region of the plate of the magnetoelastic tension sensor of FIG. 1, in accordance with an exemplary embodiment of the present invention.

FIG. 4 illustrates another detailed view of the region 300 of the plate 110, in accordance with an exemplary embodiment of the present invention. The view of the region 300 in FIG. 4 illustrates an effect of the tension caused by the forces, $F_1$ and $F_2$. The magnetic field 145 in the magnetic band 140 is represented in FIG. 4 by a vector 410. As the direction of the effective first anisotropy axis 320 changes to the direction of the second anisotropy axis 330, the magnetic field 410 inside the magnetic band 145 changes direction to a direction represented by a vector 420. The change in magnetic field is represented by a vector 430, which is perpendicular to the vector 410, the sum of the vectors 410 and 430 being the vector 420.

The change of the magnetic field, i.e., the magnetic field component 430, produces a change in the magnetic field outside the plate 110 in the region 300. The sensor 154C is positioned to detect the change in the magnetic field 430 outside the plate 140. The sensor 154C is positioned to be especially sensitive to magnetic fields in an outwardly radial direction, i.e., in a direction parallel to the centerline 170. Thus, the sensor 154C is positioned to sense the component of the magnetic field outside the plate 140 caused by the magnetic field component 430. The sensor 154C is configured to output a signal indicative of the magnetic field 430 when the tension caused by the forces, $F_1$ and $F_2$, is present.

The sensors 154A, 154B, and 154D are positioned similarly to the sensor 154C. Thus, the sensor 154A is positioned to be especially sensitive to magnetic fields in an outwardly radial direction, i.e., in a direction parallel to the centerline 170. The sensors 154B and 154D are positioned to be especially sensitive to magnetic fields in a direction parallel to the centerline 180. The sensors 154A, 154B, and 154D are positioned to sense a component of the magnetic field outside the plate 140 caused by a change of the magnetic field outside of the plate 110 because of tension in the plate 110.

Although FIGS. 3 and 4 are described with reference to a tension in the plate 110, it is to be understood that such description is applicable to an instance in which the forces, $F_1$ and $F_2$, cause compression in the plate 110. Under compression, however, the changes in the anisotropy axis and the magnetic fields are opposite to the changes described with reference to FIGS. 3 and 4 when tension is present.

Figure 5:
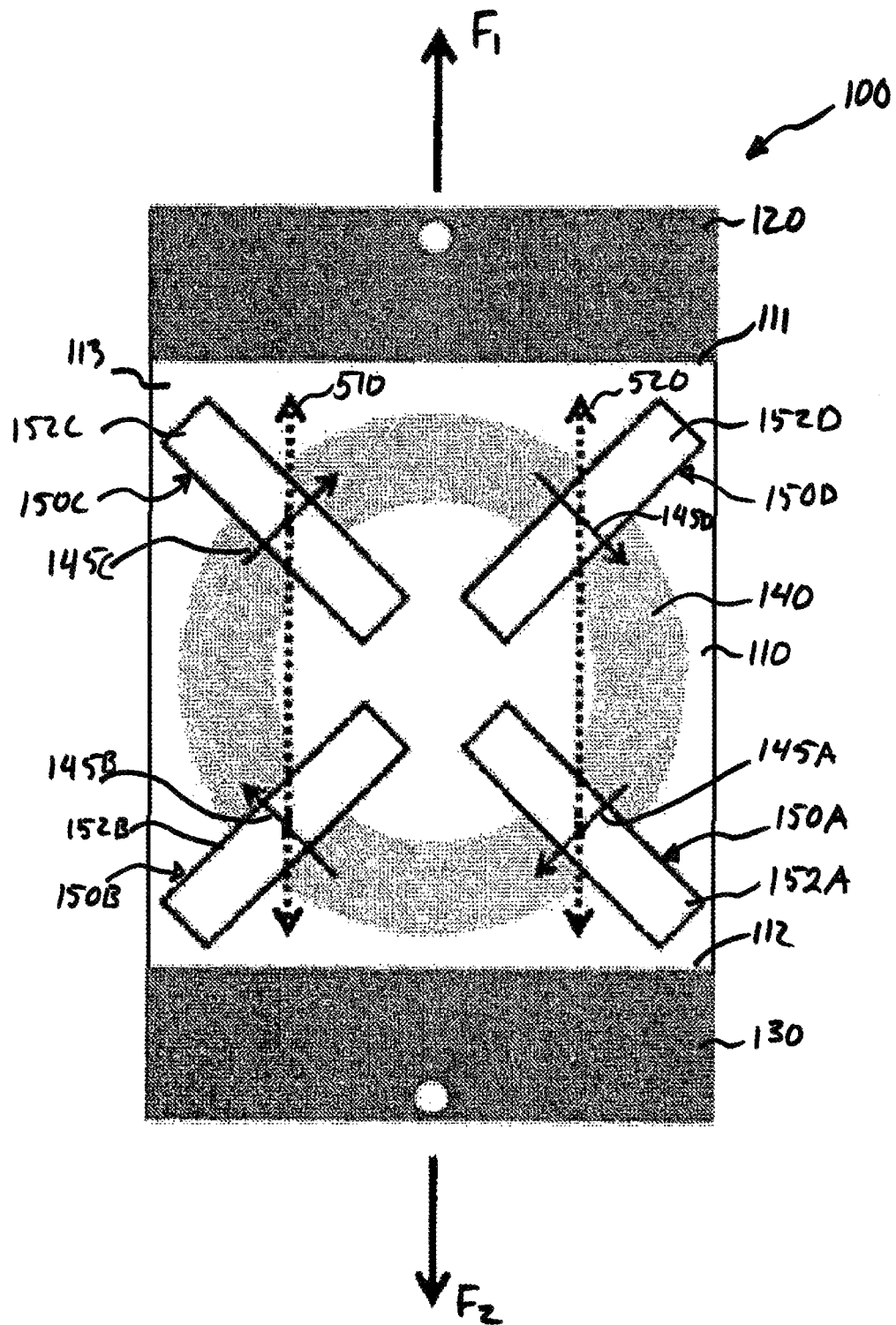
FIG. 5 illustrates another view of the magnetoelastic tension sensor of FIG. 1, in accordance with an exemplary embodiment of the present invention.

Referring now to FIG. 5, there is illustrated the magnetoelastic tension sensor 100 of FIG. 1 annotated to show strain axes 510 and 520, in accordance with an exemplary embodiment of the present invention. The strain axis 510 passes through a center point of the sensor 154C and the center point of the sensor 154B. The strain axis 520 passes through a center point of the sensor 154D, and the center point of the sensor 154A.

The sensor assembly 150A is positioned to sense a portion 145A of the magnetic field 145; sensor assembly 150B is positioned to sense a portion 145B of the magnetic field 145; sensor assembly 150C is positioned to sense a portion 145C of the magnetic field 145; and sensor assembly 150D is positioned to sense a portion 145D of the magnetic field 145. The sensors 154A through 154D produce respective signals indicative of the magnetic fields that they sense.

Each sensor signal produced by the sensors 154A through 154D comprises a first component resulting from the tension or compression in the plate 110 caused by the forces, $F_1$ and $F_2$, and a second component resulting from environmental magnetic field(s). When connected correctly to electronic circuitry (described below with reference to FIG. 11), the first components of the sensor signals provided by the magnetic field sensors 154A, 154B, 154C, and 154D in response to the tension or compression created by the forces, $F_1$ and $F_2$, add constructively. The second component of the sensor signals provided by the magnetic field sensors 154A, 154B, 154C, and 154D in response to environmental magnetic fields largely add destructively. Thus, the final sensor output (described below with reference to FIG. 11) is mostly insensitive to environmental magnetic fields.

Figure 6:
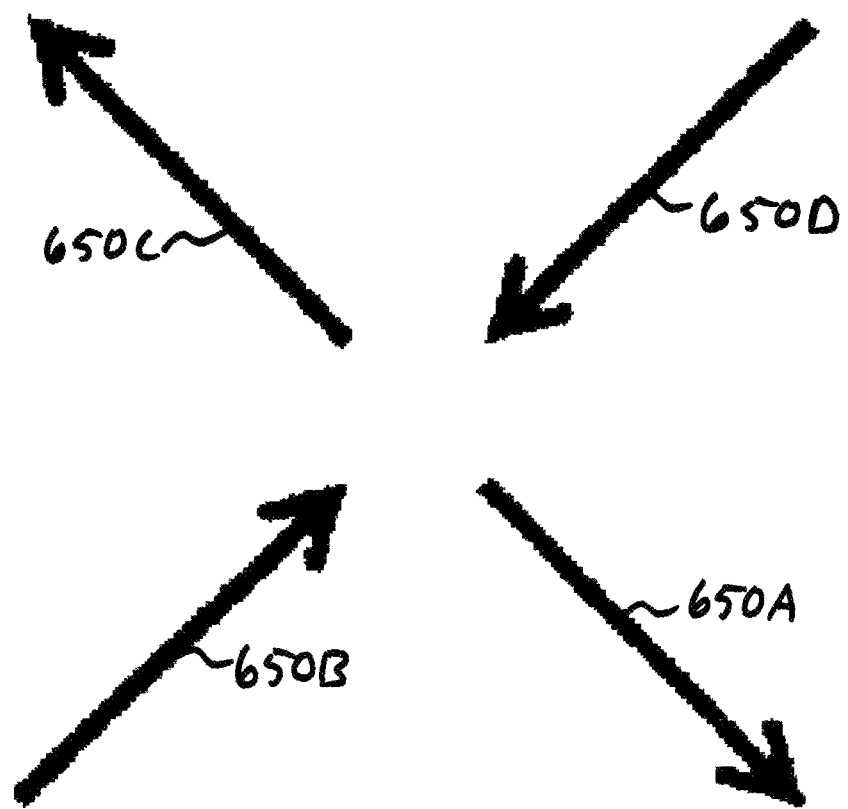
FIG. 6 illustrates various directions of changes in magnetic fields produced at the sensor assemblies of the magnetoelastic tension sensor of FIG. 1, in accordance with an exemplary embodiment of the present invention.

Referring now to FIG. 6, there are illustrated various directions of the changes in the magnetic fields produced at the locations of the sensor assemblies 150A, 150B, 150C, and 150D as a result of tension in the plate 110, in accordance with an exemplary embodiment of the present invention. When the plate 110 is placed under tension, the magnetic field 145A under the sensor assembly 150A changes, as represented by a vector 650A; the magnetic field 145B under the sensor assembly 150B changes, as represented by a vector 650B; the magnetic field 145C under the sensor assembly 150C changes, as represented by a vector 650C; and the magnetic field 145D under the sensor assembly 150D changes, as represented by a vector 650D.

The angles of the vectors 650A, 650B, 650C, and 650D are $-\alpha$, $\alpha$, $\alpha$, and $-\alpha$ relative to the centerline 160 of the plate 110 (illustrated in FIG. 1). Providing for the magnetic field sensors 154A, 154B, 154C, and 154D to have identical polarity of sensitivity to the changes 650A, 650B, 650C, and 650D in the magnetic field 145 produced by the magnetized band 140 causes the sensitivity of the final sensor output to the tension to be high. Note that the direction of the vector 650C is the same as the vector 430.

In one exemplary embodiment, the magnetic field sensors 154A, 154B, 154C are fluxgate magnetometers. In another exemplary embodiment, the magnetic field sensors 154A, 154B, 154C are Hall sensors.

The various embodiments of the magnetoelastic sensor 100 described herein are advantageous in that the magnetic field sensors 154A, 154B, 154C, and 154D sense very little magnetic field when the tension or compression is not present. This is the result of the magnetic band 140 being ring shaped or generally symmetrical about the center point 165. Thus, the magnetoelastic sensor 100 ideally has no unpaired magnetic poles where the sensor assemblies 150A, 150B, 150C, and 150D are disposed.

Figure 7:
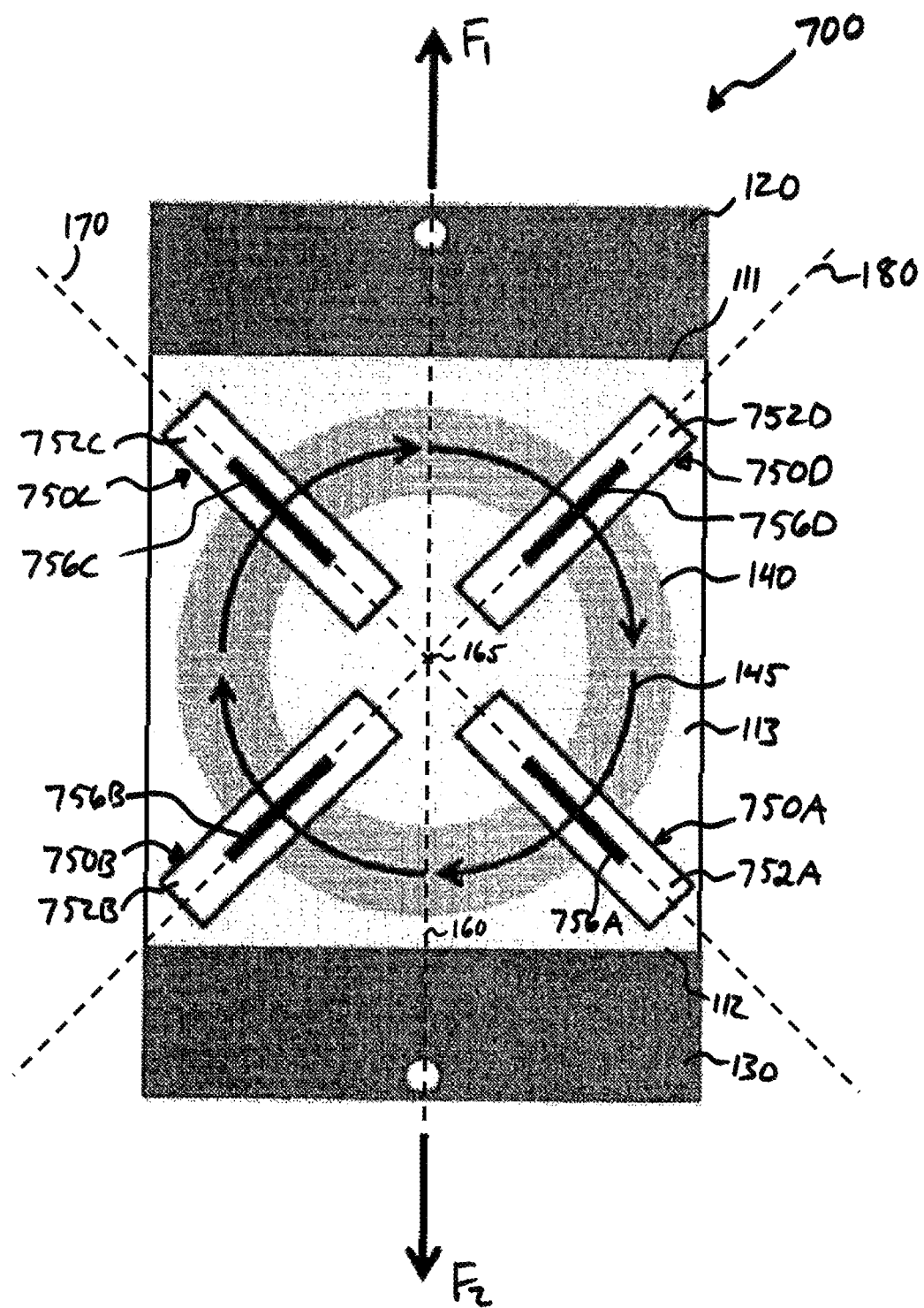
FIG. 7 illustrates an exemplary alternative embodiment of the magnetoelastic tension sensor of FIG. 1, in accordance with an exemplary embodiment of the present invention.

Illustrated in FIG. 7 is an exemplary alternative embodiment of the magnetoelastic sensor 100, generally designated in FIG. 7 as 700, in accordance with an exemplary embodiment of the present invention. In the magnetoelastic sensor 700, the sensor assemblies 150A through 150D are replaced with sensor assemblies 750A through 750D. The magnetoelastic sensor 700 is otherwise similar to the magnetoelastic sensor 100.

Figure 8A:
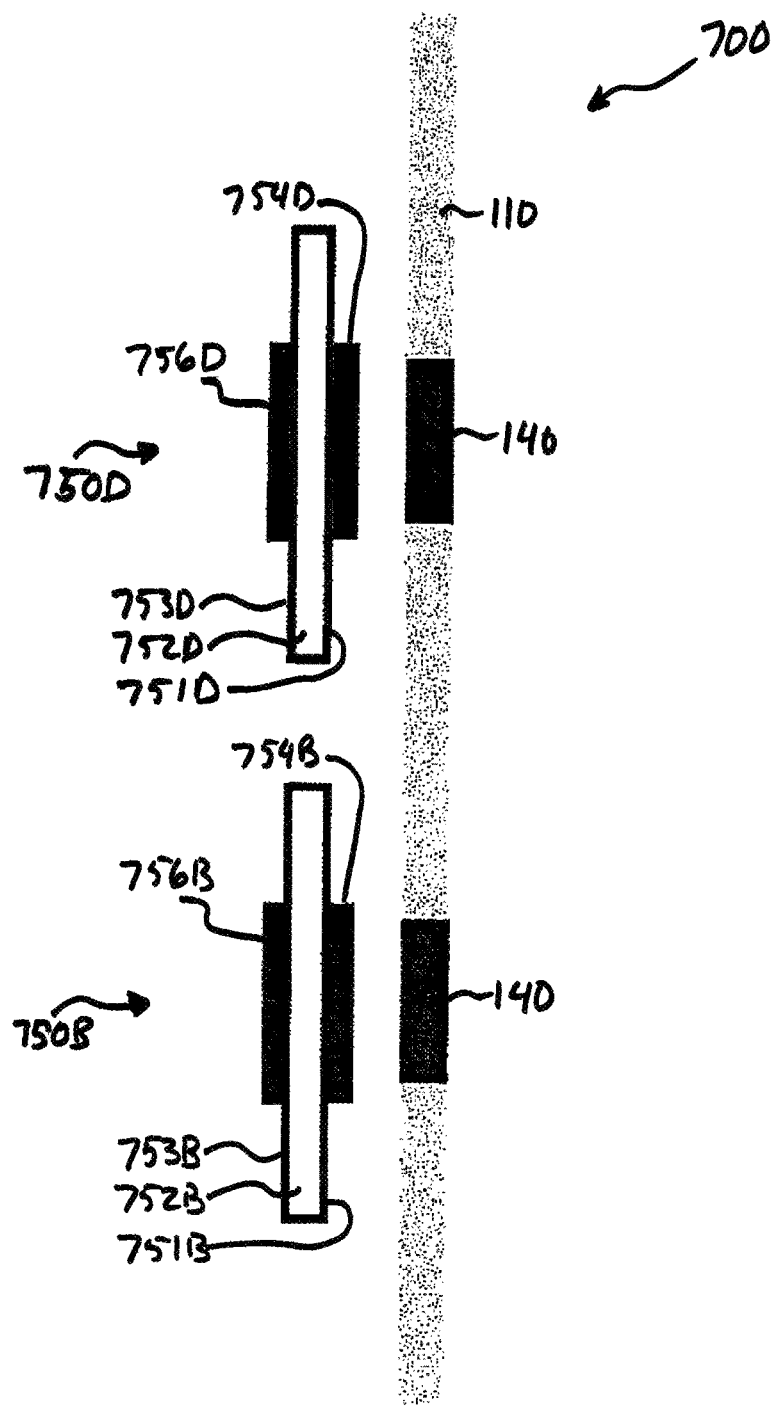
FIG. 8A illustrates a first cross-sectional view the magnetoelastic tension sensor of FIG. 7, in accordance with an exemplary embodiment of the present invention.
Figure 8B:
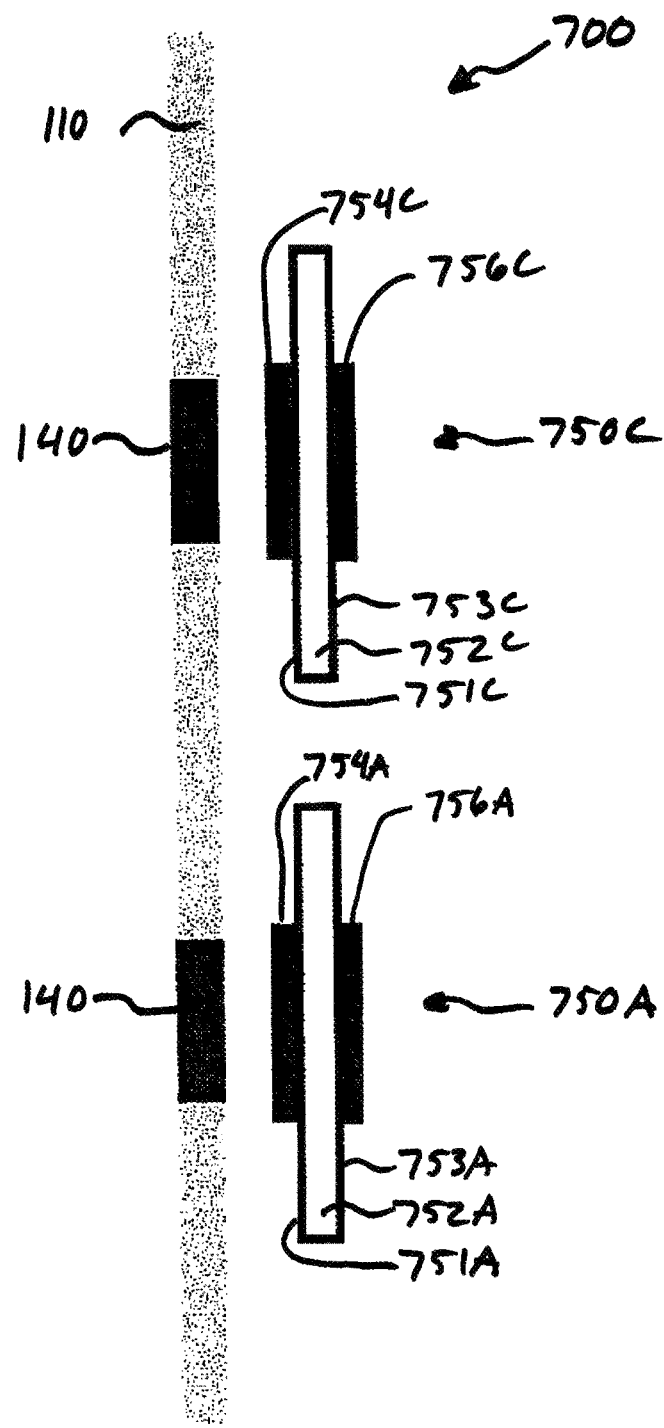
FIG. 8B illustrates a second cross-sectional view the magnetoelastic tension sensor of FIG. 7, in accordance with an exemplary embodiment of the present invention.

Illustrated in FIGS. 8A and 8B are cross-sectional views of the magnetoelastic sensor 700, in accordance with an exemplary embodiment of the present invention. FIG. 8A illustrates a right-side view along a cross-section of the magnetoelastic sensor 700 at the centerline 180, and FIG. 8B illustrates a left-side view along a cross-section of the magnetoelastic sensor 700 taken at the centerline 170.

The sensor assemblies 750A through 750D comprise respective sensor platforms 752A, 752B, 752C, and 752D, respectively, having inside surfaces 751A, 751B, 751C, and 751D and outside surfaces 753A, 753B, 753C, and 753D. The sensor assemblies 750A through 750D further comprise, respectively, first sensors 754A, 754B, 754C, and 754D disposed, respectively, on the inside surfaces 751A, 751B, 751C, and 751D and second sensors 755A, 755B, 755C, and 755D disposed, respectively, on the outside surfaces 753A, 753B, 753C, and 753D. The first sensors 754A, 754B, 754C, and 754D and the second sensors 756A, 756B, 756C, and 756D are symmetrically disposed about the center point 165 of the plate 110.

The second sensors 756A, 756B, 756C, and 756D are disposed near the first sensors 754A, 754B, 754C, and 754D but at a distance greater from the magnetic band 140 than the first sensors 754A, 754B, 754C, and 754D. The first sensors 754A, 754B, 754C, and 754D are chosen to have a direction of sensitivity opposite (180°) from their respective paired second sensors 756A, 756B, 756C, and 756D. The pairing reduces the sensitivity of the magnetoelastic sensor 700 to ambient magnetic fields compared to the magnetoelastic sensor 100.

The first sensors 754A and 754C are disposed above the magnetic band 140 along the centerline 170, and the first sensors 754B and 754D are disposed above the magnetic band 140 along the centerline 180. The centerline 170 longitudinally bisects the first sensors 754A and 754C, and the centerline 180 longitudinally bisects the first sensors 754B and 754D. The sensors 754A, 754B, 754C, and 754D are disposed over the magnetic band 140 such that a centerline 145 of the magnetic band 140 laterally bisects the sensors 754A, 754B, 754C, and 754D.

The second sensors 756A and 755C are respectively disposed above the first sensors 754A and 754C along the centerline 170, and the second sensors 756B and 756D are respectively disposed above the first sensors 754B and 754D along the centerline 180. The centerline 170 longitudinally bisects the second sensors 756A and 756C, and the centerline 180 longitudinally bisects the second sensors 756B and 756D. The sensors 755A, 755B, 755C, and 755D are disposed over the magnetic band 140 such that a centerline 145 of the magnetic band 140 laterally bisects the sensors 755A, 755B, 755C, and 755D.

Figure 9:
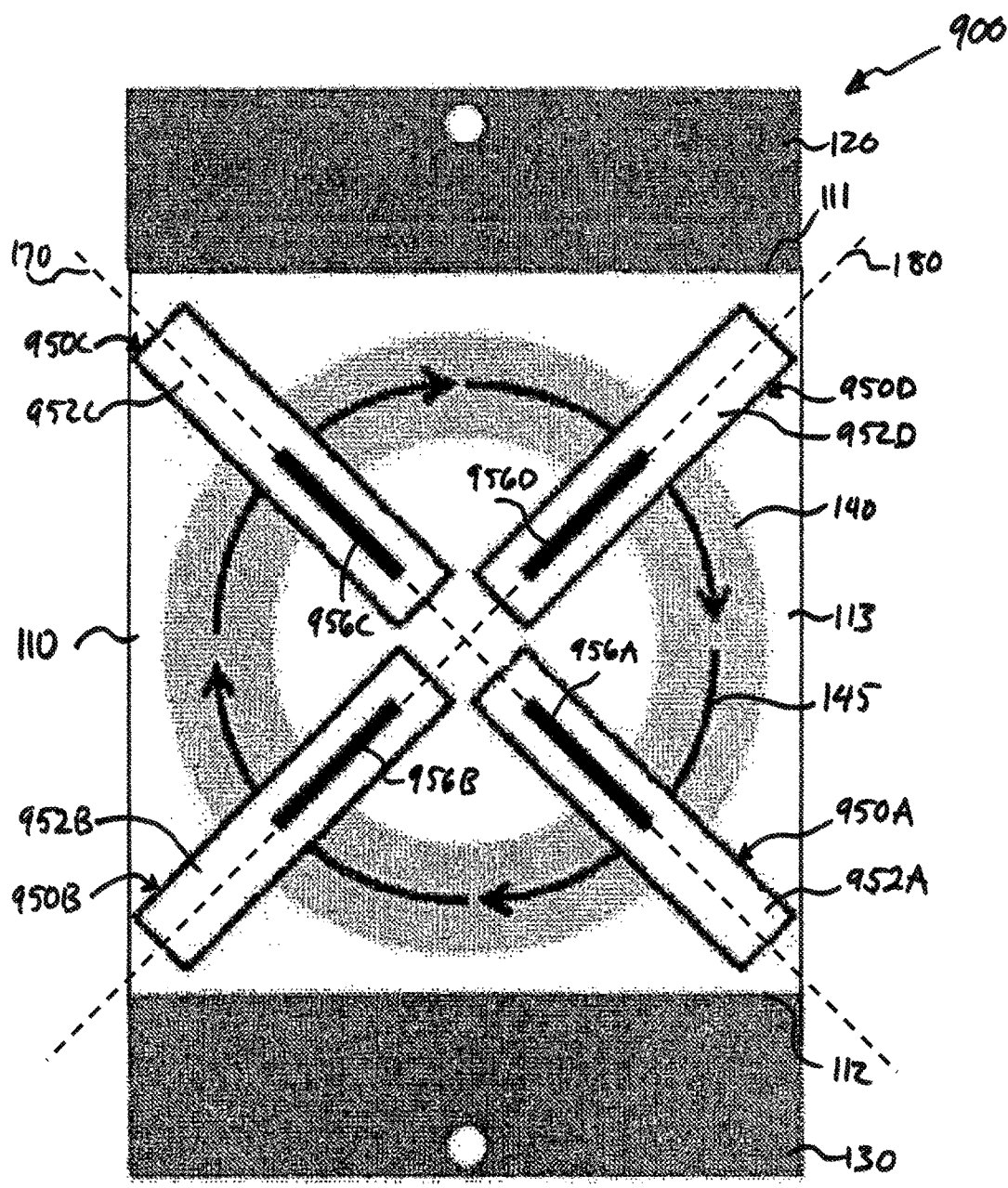
FIG. 9 illustrates an exemplary alternative embodiment of the magnetoelastic tension sensor of FIG. 7, in accordance with an exemplary embodiment of the present invention.
Figure 10A:
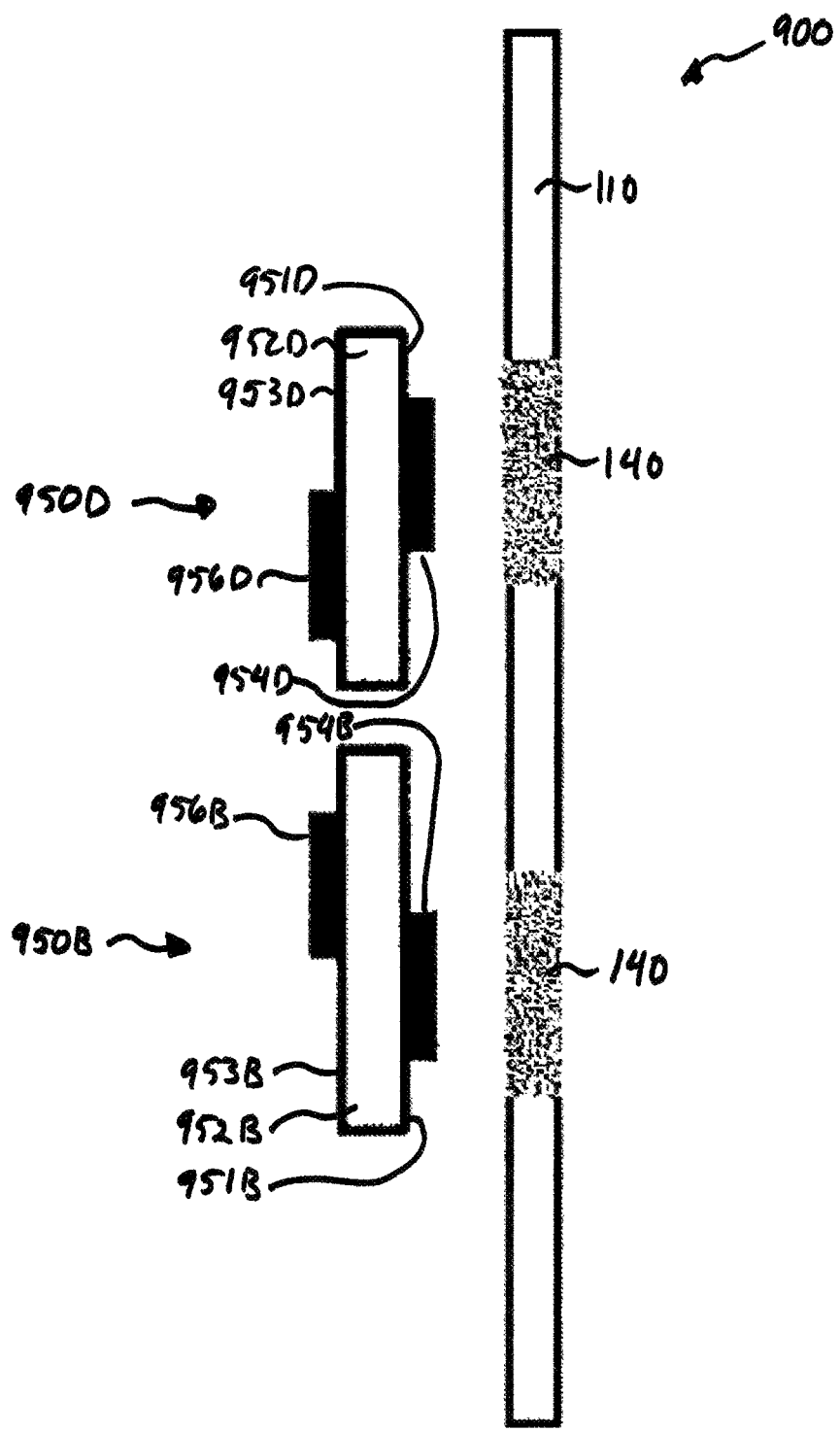
FIG. 10A is a first cross-sectional view of the magnetoelastic tension sensor of FIG. 9, in accordance with an exemplary embodiment of the present invention.
Figure 10B:
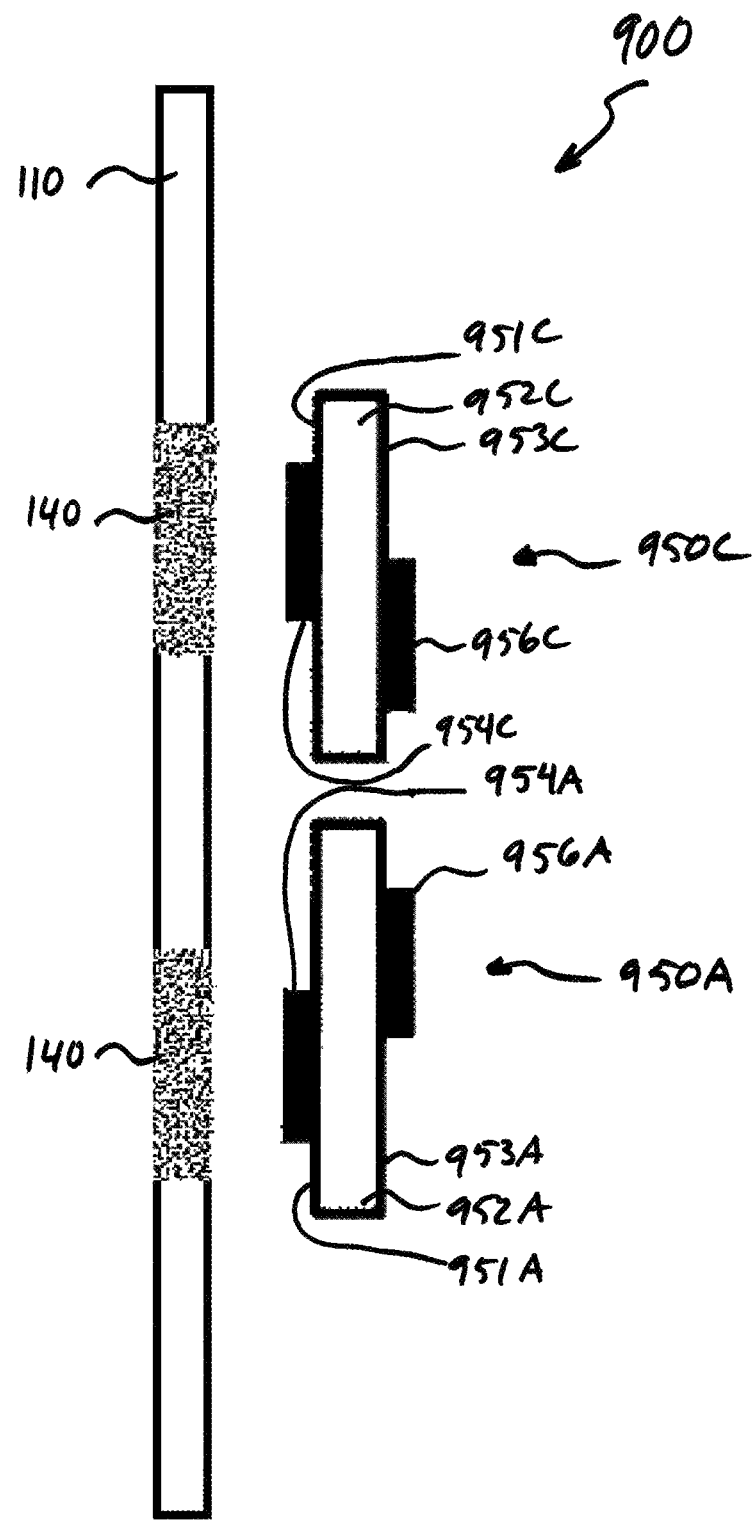
FIG. 10B is a second cross-sectional view of the magnetoelastic tension sensor of FIG. 9, in accordance with an exemplary embodiment of the present invention.

FIGS. 9, 10A, and 10B illustrate an exemplary alternative embodiment of the magnetoelastic sensor 700, generally designated in FIGS. 9, 10A, and 10B as 900, in accordance with an exemplary embodiment of the present invention. FIGS. 10A and 10B illustrate cross-sections of the magnetoelastic sensor 900 taken along the centerlines 180 and 170, respectively. The magnetoelastic sensor 900 comprises the elements of the magnetoelastic sensor 700. In the magnetoelastic sensor 900, the sensor assemblies 750A through 750D are replaced with sensor assemblies 950A through 950D.

The sensor assemblies 950A through 950D comprise respective sensor platforms 952A, 952B, 952C, and 952D respectively having inside surfaces 951A, 951B, 951C, and 951D and outside surfaces 953A, 953B, 953C, and 953D. The sensor assemblies 950A through 950D further comprise, respectively, first sensors 954A, 954B, 954C, and 954D disposed, respectively, on the inside surfaces 951A, 951B, 951C, and 951D and second sensors 956A, 956B, 956C, and 956D disposed, respectively, on the outside surfaces 953A, 953B, 953C, and 953D.

The sensor assemblies 950A through 950D are similar to the sensor assemblies 750A through 750D, but they differ in that the second sensors 956A, 956B, 956C, and 956D are inset radially relative to the center point 165 of the magnetic band 140 compared to the second sensors 755A, 755B, 755C, and 755D. This inset is best seen in FIG. 9. The magnetoelastic sensor 700 includes no such inset.

Figure 11:
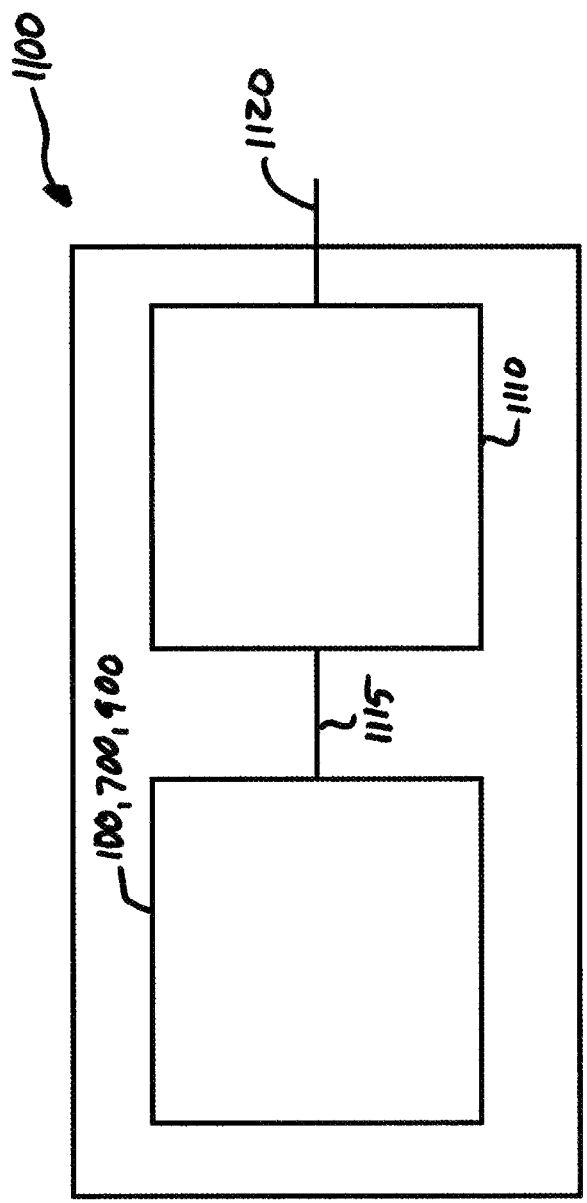
FIG. 11 illustrates a sensor assembly comprising the magnetoelastic tension sensor of FIG. 1, 7, or 9, in accordance with an exemplary embodiment of the present invention.

Referring now to FIG. 11, there is illustrated a schematic drawing of an exemplary embodiment of a sensor assembly, generally designated as 1100, in accordance with an exemplary embodiment of the present invention. The sensor assembly 1100 comprises a magnetoelastic sensor 100, 700, or 900 connected to circuitry 1110 via a communications link 1115. The magnetoelastic sensor 100, 700, or 900 outputs the signals from its sensor assemblies via the communications link 1115 to the circuitry 1110. The circuitry 1110 combines the signals provided by the sensor assemblies and outputs the combined signal via an output 1120. The output 1120 indicates the amount of tension or compression sensed by the magnetoelastic sensor 100, 700, or 900.

EXAMPLE 1

Figure 12:
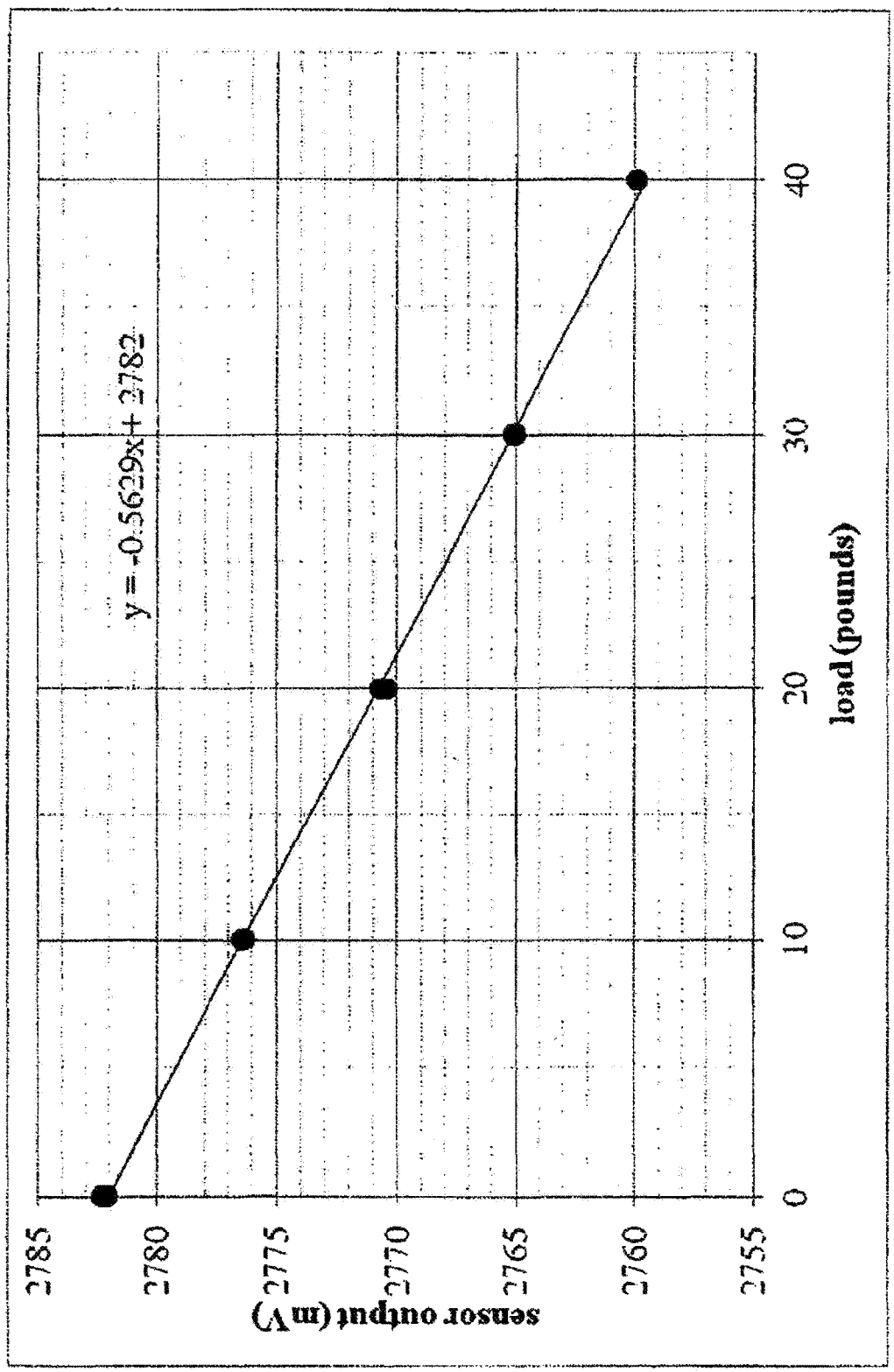
FIG. 12 illustrates a graph of data from a test of an exemplary implementation of the magnetoelastic tension sensor of FIG. 1, in accordance with an exemplary embodiment of the present invention.
Figure 13:
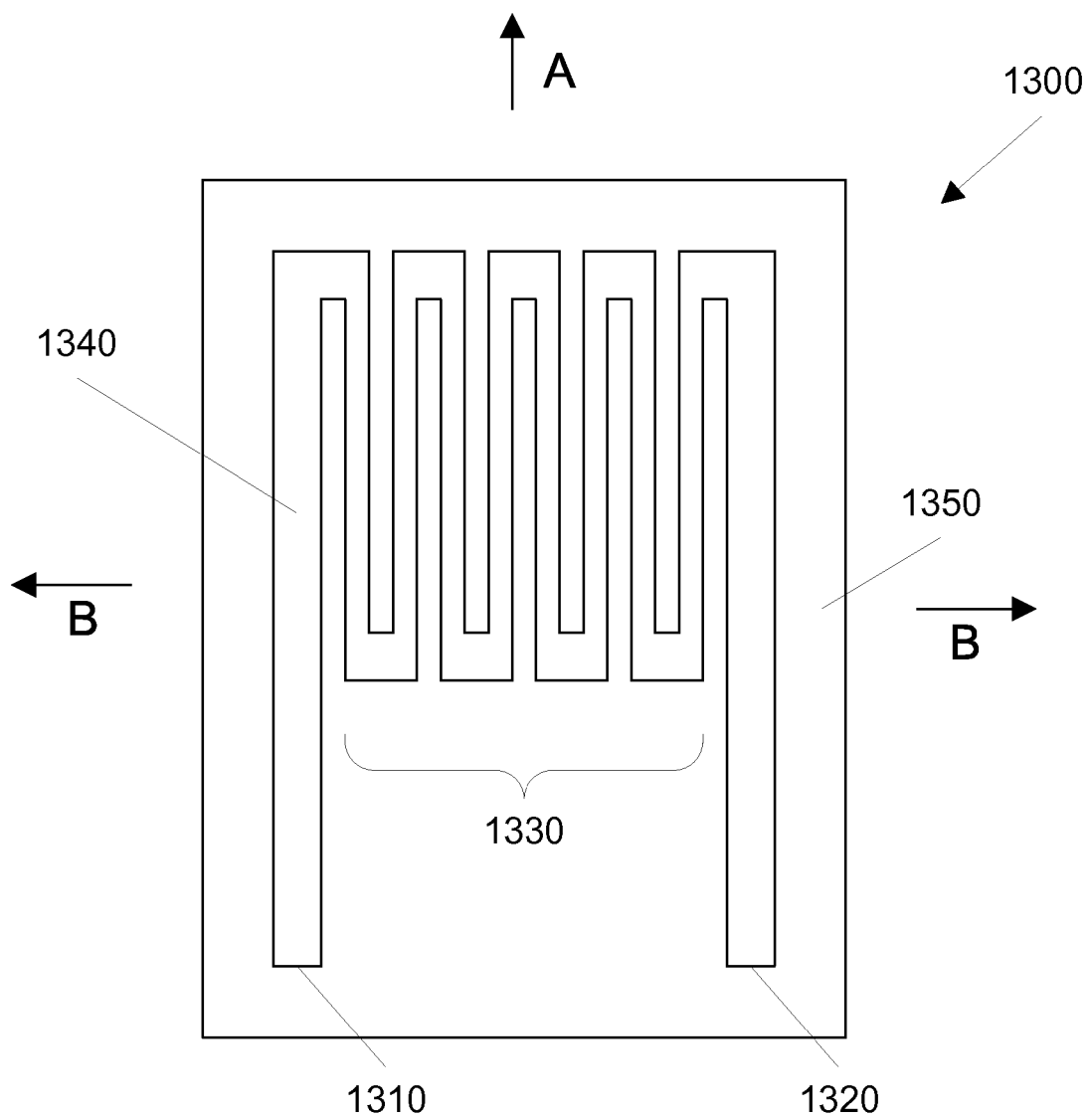
FIG. 13 illustrates a conventional strain gauge.
Figure 14:
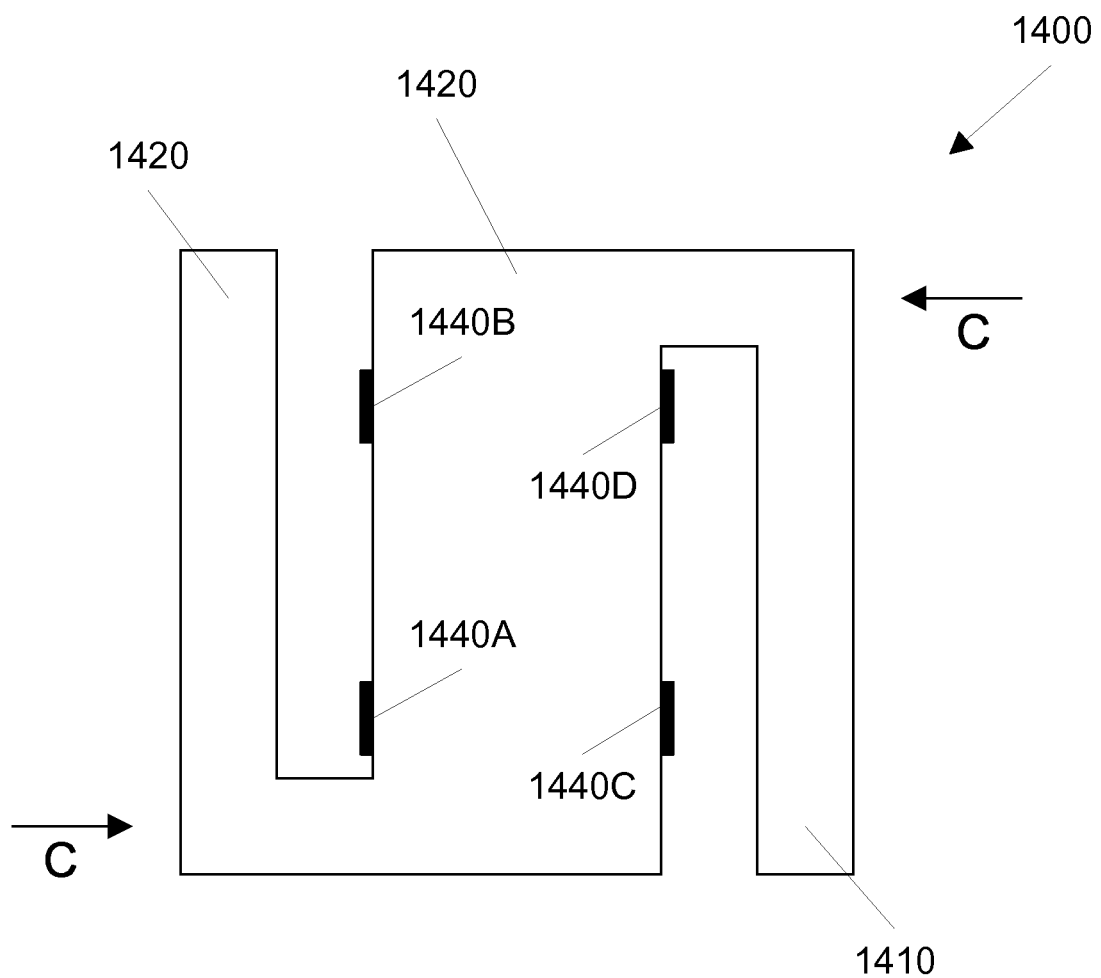
FIG. 14 illustrates a conventional load cell.

Referring now to FIG. 12, there is illustrated a graph of data from a test of an exemplary implementation of the magnetoelastic sensor 100. Weights were hung from the exemplary implementation of the magnetoelastic sensor 100, and the output voltage was recorded. The slope in the graph shows a sensitivity of 0.56 mV/pound.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A tension sensor for sensing a tension force comprising:
a plate comprising a magnetoelastic region;
at least one pair of sensors disposed on a same side of the plate above the magnetoelastic region, the at least one pair of sensors configured to sense a magnetic field produced by the magnetoelastic region due to a strain in the plate imposed by the tension force applied to the plate; and
at least one pair of sensor platforms on which each of the at least one pair of sensors are respectively disposed, wherein the at least one pair of sensors are disposed between the respective at least one pair of sensor platforms and the magnetoelastic region.

2. The tension sensor of claim 1, wherein the magnetoelastic region is symmetrical about a centerpoint of the magnetoelastic region.

3. The tension sensor of claim 1, where the at least one pair of sensors are symmetrically disposed above the magnetoelastic region about a centerpoint of the magnetoelastic region.

4. The tension sensor of claim 1, further comprising a second pair of sensors respectively disposed on the at least one pair of sensor platforms on a side of the respective at least one pair of sensor platforms opposite the respective at least one pair of sensors.

5. The tension sensor of claim 4, wherein the second pair of sensors are radially inset relative to the at least one pair of sensors.

6. The tension sensor of claim 1, wherein the magnetoelastic region is annular.

7. The tension sensor of claim 6, wherein each of the at least one pair of sensors is bisected laterally by the magnetoelastic region.

8. The tension sensor of claim 7, wherein each of the at least one pair of sensors are disposed above the magnetoelastic region in a direction perpendicular to the magnetic field produced by magnetoelastic region and neither parallel nor perpendicular to a direction of the tension.

9. A compression sensor for sensing a compression force comprising:
a plate comprising a magnetoelastic region;
at least one pair of sensors disposed on a same side of the plate above the magnetoelastic region, the at least one pair of sensors configured to sense a magnetic field produced by the magnetoelastic region due to a strain in the plate imposed by the compression force applied to the plate; and
at least one pair of sensor platforms on which each of the at least one pair of sensors are respectively disposed, wherein the at least one pair of sensors are disposed between the respective at least one pair of sensor platforms and the magnetoelastic region.

10. The compression sensor of claim 9, wherein the magnetoelastic region is symmetrical about a centerpoint of the magnetoelastic region.

11. The compression sensor of claim 9, where the at least one pair of sensors are symmetrically disposed above the magnetoelastic region about a centerpoint of the magnetoelastic region.

12. The compression sensor of claim 9, further comprising a second pair of sensors respectively disposed on the at least one pair of sensor platforms on a side of the respective at least one pair of sensor platforms opposite the respective at least one pair of sensors.

13. The compression sensor of claim 12, wherein the second pair of sensors are radially inset relative to the at least one pair of sensors.

14. The compression sensor of claim 9, wherein the magnetoelastic region is annular.

15. The compression sensor of claim 14, wherein each of the at least one pair of sensors is bisected laterally by the magnetoelastic region.

16. The compression sensor of claim 15, wherein each of the at least one pair of sensors are disposed above the magnetoelastic region in a direction perpendicular to the magnetic field produced by magnetoelastic region and neither parallel nor perpendicular to a direction of the compression.

17. A method of manufacturing a magnetoelastic sensor for sensing a tension or a compression force comprising:
   forming a plate from an austenetic non-magnetic stainless steel alloy;
   cold-working an area of the plate to convert the austenetic non-magnetic stainless steel alloy in the area of the plate to martensite;
   rotating the plate;
   bringing a magnet near a surface of the plate and near the area of the plate converted to martensite to magnetize the area; and
   mounting at least one pair of magnetic field sensors on a same side of the plate above the surface of the plate near the magnetized area to sense a magnetic field produced by the magnetized area due to a strain in the plate imposed by a tension or a compression force applied to the plate; and
   mounting at least one pair of sensor platforms on which each of the at least one pair of sensors are respectively disposed, wherein the at least one pair of sensors are disposed between the respective at least one pair of sensor platforms and the magnetoelastic region.

18. The method of claim 17, wherein the step of mounting comprises disposing the at least one pair of magnetic field sensors symmetrically above the surface of the plate near the magnetized area.

* * * * *